US007121616B2

(12) United States Patent
Cooley

(10) Patent No.: US 7,121,616 B2
(45) Date of Patent: Oct. 17, 2006

(54) VEHICLE DOOR WEDGE ASSEMBLY

(75) Inventor: Brock T. Cooley, Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 59 days.

(21) Appl. No.: 10/909,796

(22) Filed: Jul. 30, 2004

(65) Prior Publication Data

US 2005/0104407 A1 May 19, 2005

Related U.S. Application Data

(60) Provisional application No. 60/520,685, filed on Nov. 17, 2003.

(51) Int. Cl.
*B60R 27/00* (2006.01)

(52) U.S. Cl. .................................................... 296/207

(58) Field of Classification Search ................ 296/207, 296/1.03

See application file for complete search history.

(56) References Cited

U.S. PATENT DOCUMENTS

| | | | | |
|---|---|---|---|---|
| 1,139,732 | A * | 5/1915 | Slick | 267/2 |
| 2,054,449 | A * | 9/1936 | Williams et al. | 16/85 |
| 2,268,976 | A * | 1/1942 | Westrope | 16/86 C |
| 2,852,424 | A * | 9/1958 | Reinhart et al. | 156/154 |
| 3,321,200 | A * | 5/1967 | Polhemus et al. | 267/64.27 |
| 3,373,629 | A * | 3/1968 | Wight et al. | 74/492 |
| 3,378,426 | A * | 4/1968 | Medney | 156/430 |
| 3,412,628 | A * | 11/1968 | De Gain | 74/492 |
| 3,479,902 | A * | 11/1969 | Okamoto | 74/492 |
| 3,482,466 | A * | 12/1969 | Kales et al. | 74/492 |
| 3,586,131 | A * | 6/1971 | Le Mire | 188/371 |
| 3,612,223 | A * | 10/1971 | Shiomi et al. | 188/375 |
| 3,624,764 | A * | 11/1971 | Goben | 188/377 |
| 4,681,110 | A * | 7/1987 | Wiktor | 606/194 |
| 4,932,100 | A | 6/1990 | Flowers et al. | 16/82 |
| 5,747,140 | A * | 5/1998 | Heerklotz | 428/131 |
| 6,170,808 | B1 * | 1/2001 | Kutschi | 267/107 |
| 6,669,184 | B1 * | 12/2003 | Cai et al. | 267/162 |
| 6,964,451 | B1 * | 11/2005 | Bergey | 297/216.1 |

* cited by examiner

*Primary Examiner*—H Gutman
(74) *Attorney, Agent, or Firm*—Paul F. Donovan; Mark W. Croll

(57) ABSTRACT

A vehicle door wedge assembly includes a chassis and a slide moveable within the chassis. A non-metallic, elastomeric biasing element is provided to urge the slide toward one end of the chassis. The vehicle door wedge assembly with the chassis defines a slide path for the slide to move along, and the non-metallic, elastomeric biasing element is disposed between the chassis and the slide for urging the slide toward one end of the path.

15 Claims, 3 Drawing Sheets

VEHICLE DOOR WEDGE ASSEMBLY

CROSS-REFERENCE TO RELATED APPLICATIONS

The present regular United States Patent Application claims the benefits of U.S. Provisional Application Ser. No. 60/520,685, filed Nov. 17, 2003, entitled "Door Wedge".

FIELD OF THE INVENTION

The present invention relates to door wedges used in automobiles to limit rattle, and, more particularly, to the springs used in such door wedges.

BACKGROUND OF THE INVENTION

Door wedge assemblies are known for use in automobiles to limit vibration and rattle of the door when closed. Door wedge assemblies of this type are known for use in vehicles in which two doors close together to form an overlapping joint. Such arrangements are found in trucks, for example, in which a third or rear door is provided behind the standard truck cab door.

Door wedge assemblies reduce rattle, squeak and vibrations, which many users find objectionable. Further however, the stresses from vibration and rattling can cause premature material fatigue. Thus, the wedge assemblies provide not only enhanced user comfort by reducing noise, such wedges also promote long life of the door components.

Known door wedge assemblies have included a body or chassis anchored to the door, such as by tabs that mate with holes of the proper size and position in the bottom of the door. A slide is provided, movable along a path defined in the chassis. The slide forms a wedge component and is biased in the chassis by a metallic spring. The wedge portion of the wedge assembly engages a fixed position cooperative wedge on the opposing vehicle surface. As the door is closed, the wedging components engage one another, causing the slide to move, placing the spring in tension. The wedging action reduces door rattle and provides a more stable connection between the door and the vehicle body. When the door is opened, the spring moves the slide to its non-operating position in the chassis.

While such door wedge assemblies of known design have provided advantages, the wedge assemblies can be difficult, time consuming and costly to assemble, and therefore comparatively expensive. Further, a detectible rattle may occur from the wedge itself, associated with the metallic spring used in the wedge structure. Movement of the slide by action of the metallic spring can cause objectionable noises.

What is needed in the art is a vehicle door wedge assembly that can be manufactured efficiently and at low cost and which is quiet and efficient in operation.

SUMMARY OF THE INVENTION

The present invention provides an elastomeric biasing element between the slide and the chassis of the wedge assembly, with a chassis configured as a retrofit structure that can be used in existing door components.

In one aspect thereof, the present invention provides an automobile door wedge assembly with a chassis defining a slide path, a slide movable along the slide path; and an elastomeric, non-metallic biasing element disposed between the chassis and the slide for urging the slide toward one end of the path.

In another aspect thereof, the present invention provides a biasing element for a door wedge assembly in a vehicle, the biasing element being an elastomeric, nonmetallic body.

In a still further aspect thereof, the present invention provides an improvement for a vehicle door wedge assembly having a chassis and a slide movable in the chassis, the improvement being a nonmetallic biasing element between the chassis and the slide made of an elastomer.

An advantage of the present invention is providing a vehicle door wedge assembly that can be manufactured economically with inexpensive, yet durable materials.

Another advantage of the present invention is providing a vehicle door wedge assembly that can be used as a retrofit part in existing door configurations.

Still another advantage of the present invention is providing a vehicle door wedge assembly that is quiet in operation throughout its life.

A further advantage of the present invention is providing an improved vehicle door wedge assembly.

A still further advantage of the present invention is providing a biasing element for a vehicle door wedge assembly that has long life and is quiet and reliable in performance.

Other features and advantages of the invention will become apparent to those skilled in the art upon review of the following detailed description, claims and drawings in which like numerals are used to designate like features.

DETAILED DESCRIPTION OF THE PREFERRED EMBODIMENT

Figure 1:
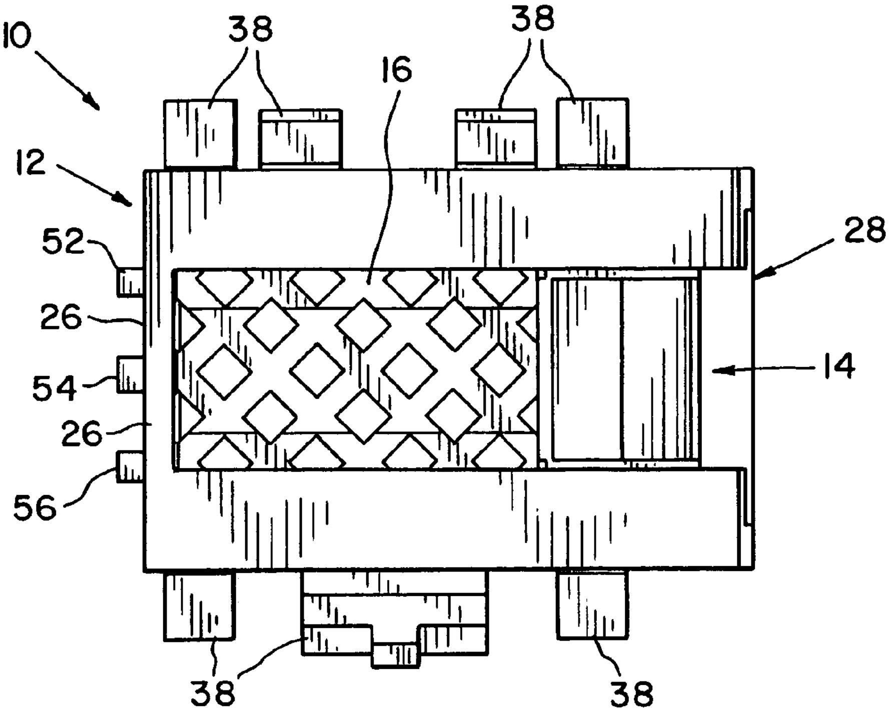
FIG. 1 is a plan view of a vehicle door wedge assembly in accordance with the present invention.
Figure 2:
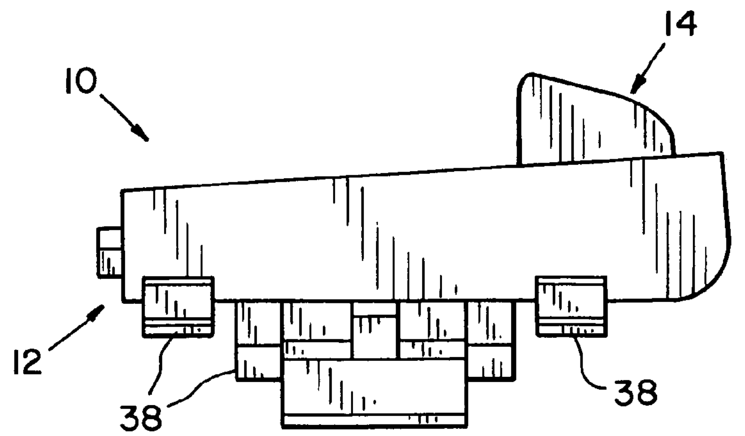
FIG. 2 is a side elevational view of the door wedge assembly shown in FIG. 1.

Referring now more specifically to the drawings, and to FIG. 1 in particular, numeral 10 designates a door wedge assembly in accordance with the present invention. Assembly 10 includes generally a chassis 12, a slide 14 movably positioned within chassis 12, and a biasing element 16 operationally disposed between chassis 12 and slide 14. It should be understood that the size, configuration and overall shape of door wedge assembly 10, and particularly chassis 12 thereof, may vary from one assembly 10 to another, to be used on different vehicles, for efficient installation and operation with doors of various sizes and styles and door frames accommodating such doors.

Figure 3:
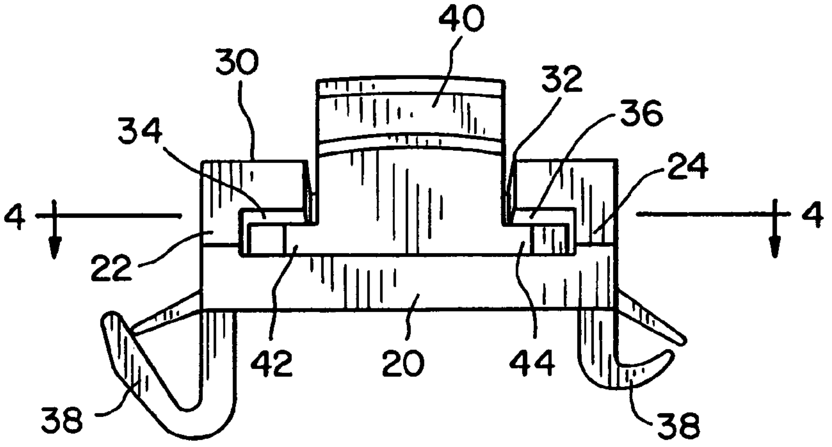
FIG. 3 is an end view of the door wedge assembly shown in FIGS. 1 and 2.

Chassis 12 is the anchoring body for door wedge assembly 10 and accommodates operation of slide 14 and biasing element 16. As seen best in FIG. 3, chassis 12 includes a base 20, first and second side panels 22 and 24 and an end panel 26. An opening 28 is provided in chassis 12 at the end of chassis 12 opposite end panel 26. A cover 30 is provided in spaced relation to base 20. Cover 30 has an elongated slot 32 therein between sides 22 and 24 and extending from opening 28 to or near end 26. Slot 32 thereby defines the limits of a path along which slide 14 can move, as will be described in greater detail hereinafter.

Cover 30 projects inwardly from sides 22 and 24, in spaced relation to base 20, thereby forming first and second channels 34 and 36 along the side of slot 32. One or more supports 38 are provided on chassis 12 for anchoring chassis 12 in the vehicle door. Chassis 12 may include a plurality of supports 38, as shown in the exemplary embodiment, in the nature of spring feet or tabs that are received in holes on the door bottom (not shown) for mounting. The manner in which chassis 12 can be anchored to a door (not shown) is well known to those skilled in the art and will not be described in further detail herein. It should be understood that chassis 12 can be provided in configurations similar to known configurations, such that door wedge assembly 10 of the present invention can be used in place of, or as a replacement for previously used door wedge assemblies.

Slide 14 is received in chassis 12 for movement along the path defined by slot 32. Slide 14 includes a main body 40 projecting outwardly through cover 30 and is configured for performing the wedging function with a complementary wedge, not shown, as those skilled in the art will readily understand. First and second lateral flanges 42 and 44 are provided along the sides of main body 40, and are received slidably in, for movement along first and second channels 34 and 36, respectively.

Chassis 12 and slide 14 can be made of various materials, including various polymers that are resistant to corrosion and wear from use.

Figure 4:
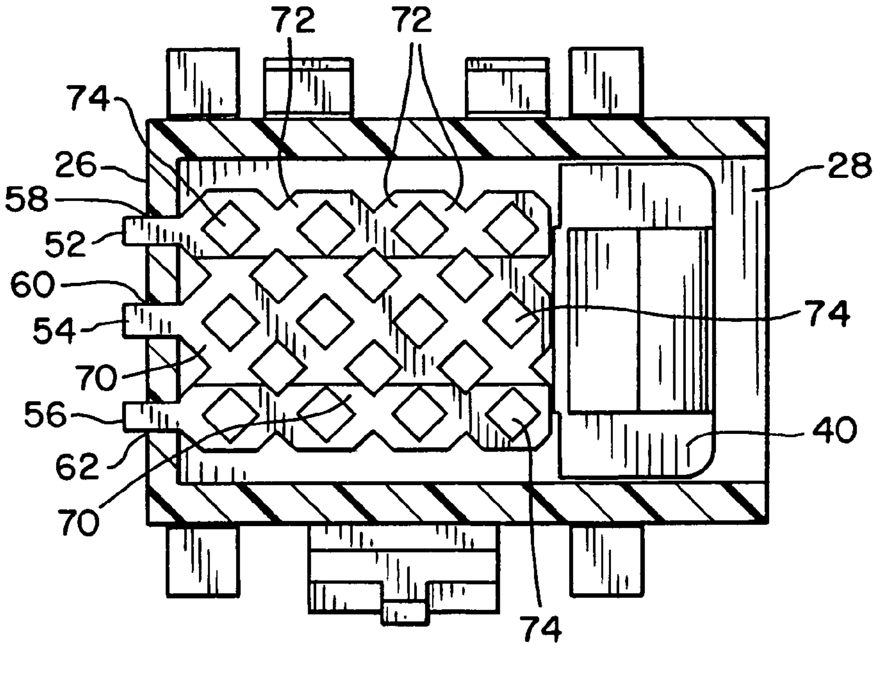
FIG. 4 is a cross-sectional view of the door wedge assembly shown in FIGS. 1–3, the cross-section being take along line 4—4 of FIG. 3.
Figure 5:
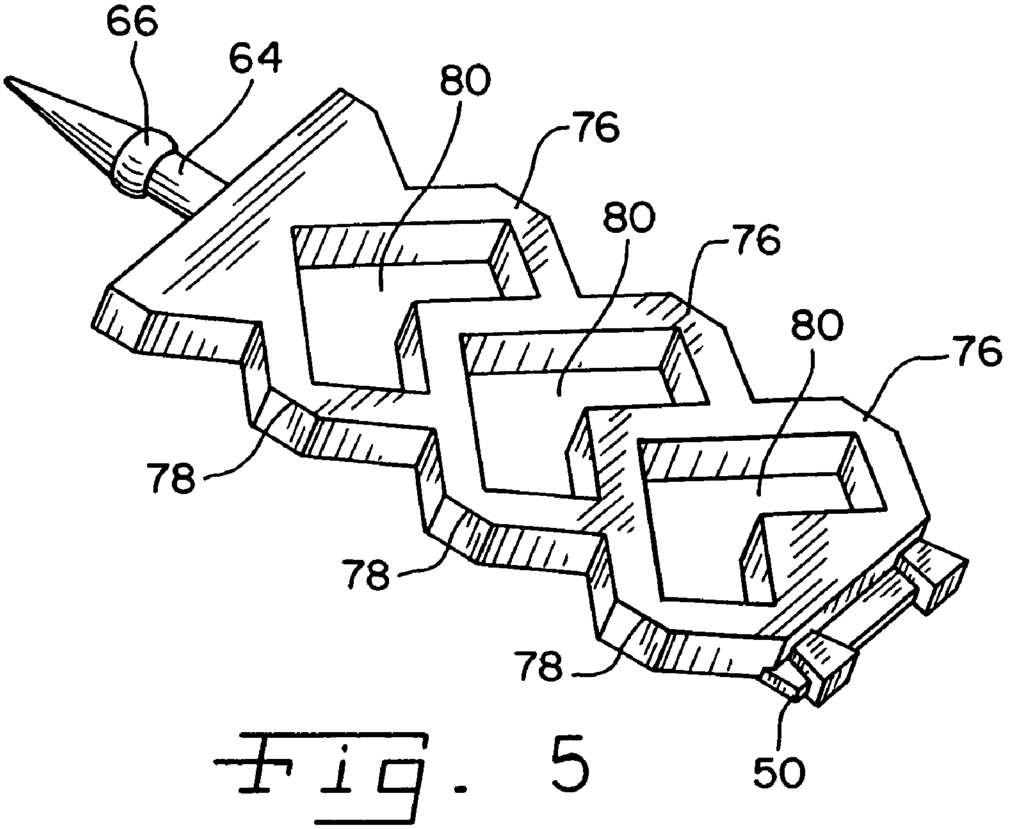
FIG. 5 is a perspective view of a modified biasing element used in the door wedge assembly of the present invention Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

Biasing element 16 is a non-metallic elastomric body operatively disposed within the slide path for slide 14 within chassis 12. Biasing element 16 is anchored to both chassis 12 and slide 14. Biasing element 16 can be manufactured of a thermoplastic elastomer and can be provided as an overmolding of slide 14 or a portion thereof such that slide 14 and biasing element 16 become an integral, single body. Alternatively, biasing element 16 can be mechanically joined to slide 14 or chemically bonded with adhesive or through the processing of two dissimilar materials. One suitable configuration for mechanical attachment of biasing element 16 to slide 14 includes a dovetail 50 provided on an end of biasing element 16, with dovetail 50 received in a suitable dovetail opening of slide 14. During assembly, biasing element 16 also is connected to chassis 12. FIG. 4 illustrates an embodiment in which three projections 52,54 and 56 are provided at an end of biasing element 16 and are received in apertures 58, 60 and 62 in end panel 26 of chassis 12. Alternatively, a shaped projection or projections 64 can be provided with an enlarged ring or end 66 as shown in FIG. 5. Projection 64 is anchored in a suitable aperture through which enlarged end 66 is forced during assembly. The shape of enlarged end 66 improves pullout resistance of projection 64 compared to a straight projection. Other mechanical attachment arrangements and/or chemical bonding with adhesive also can be used for connecting biasing element 16 to chassis 12.

In the embodiment illustrated in FIGS. 1–4, biasing element 16 is a cored structure having a lattice-like arrangement of strips 70 and 72 defining cored out regions or openings 74 therebetween For clarity, only some strips 70, 72 and some openings 74 and not all strips 70, 72 and openings 74 are designated with reference numerals in the drawings. It should be understood that other cored configurations also can be used. Varying the size and shape of the cored out regions can control the resiliency or elasticity of biasing element 16. One such alternative configuration is shown in FIG. 5 in which angular members 76 and 78 are interconnected with openings 80 therebetween. Other types of cored structures having openings also can be used. Cored structures are of advantage in allowing the compression of biasing element 16 as slide 14 moves along chassis 12. With suitable elastomeric material, non-cored structures also can be used. Biasing element 16 can be manufactured efficiently in the desired shape and configuration using known molding processes for thermoplastic elastomers, including two-shot overmolding processes to form slide 14 and biasing element 16 as a single structure.

Assembly of wedge assembly 10 is made easy in that biasing element 16 can be pre-assembled to slide 14 by chemical bonding with adhesive or through the processing of two dissimilar materials or by mechanical attachment including overmolding, dovetail connections or the like. The pre-assembled unit of slide 14 and biasing element 16 is inserted into chassis 12 through opening 28, and biasing element 16 is connected to end panel 26 by mechanical connection, chemical bonding or the like. Projections 52, 54, 56 can be secured in apertures 58, 60, 62 by interference fit and/or chemical bonding. If a shaped projection or projections 64 are used, enlarged end 66 is forced through an appropriate aperture to secure biasing element 16 to end panel 26.

Assembly 10 can be secured to a vehicle door in the same manner as previous door wedge assemblies using supports 38, chemical bonding, or other known attachment procedures.

Upon installation and use of door wedge assembly 10, vehicle doors (not shown) remain aligned and rattle free during operation of the vehicle. Slide 14 creates the interference needed to provide for the rattle free performance while biasing element 16 supplies the force required to maintain the position of slide 14 in chassis 12. When the door is shut and engages slide 14, slide 14 is forced against biasing element 16 until biasing element 16 bottoms out against end panel 26 of chassis 12. Thus, during operation of the vehicle, slide 14 is in substantially fixed, non-moveable position within chassis 12, eliminating rattle. Slide 14 is thereby maintained in proper operating or wedging position. The door is thereby held firmly in place.

While shown and described herein with biasing element 16 configured to operate in compression, it should be understood by those skilled in the art that by moving biasing element 16 to the opposite side of slide 14, biasing element 16 can be provided to operate in tension, rather than in compression. Non-metallic, elastomeric biasing elements 16 of the present invention work well in both arrangements.

Variations and modifications of the foregoing are within the scope of the present invention It is understood that the invention disclosed and defined herein extends to all alternative combinations of two or more of the individual features mentioned or evident from the text and/or drawings.

All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An automobile door wedge assembly comprising:

a chassis defining a slide path;

a slide movable along said slide path; and an elastomeric, non-metallic biasing element disposed between said chassis and said slide for urging said slide toward one end of said path, said biasing element being an overmolding on at least a portion of said slide.

2. An automobile door wedge assembly comprising:

a chassis defining a slide path;

a slide movable along said slide path; and an elastomeric, non-metallic biasing element disposed between said chassis and said slide for urging said slide toward one end of said path, said biasing element being chemically bonded to at least one of said chassis and said slide, and said biasing element being a cored out structure having openings therethrough.

3. An automobile door wedge assembly comprising:

a chassis defining a slide path;

a slide movable along said slide path; and an elastomeric, non-metallic biasing element disposed between said chassis and said slide for urging said slide toward one end of said path, said biasing element having a mechanical connection to said slide.

4. The door wedge assembly of claim 3, said biasing element configured in a lattice structure.

5. The door wedge assembly of claim 3, said mechanical connection including a dovetail projection on one end of said biasing element.

6. An automobile door wedge assembly comprising:

a chassis defining a slide path;

a slide movable along said slide path, and an elastomeric, non-metallic biasing element disposed between said chassis and said slide for urging said slide toward one end of said path, said biasing element having a projection at one end thereof and said chassis having an aperture for receiving said projection.

7. The door wedge assembly of claim 6, said biasing element having at least two said projections and said chassis having one said aperture for each said projection.

8. The door wedge assembly of claim 6, said projection having an enlarged end.

9. An automobile door wedge assembly comprising:

a chassis defining a slide path;

a slide movable along said slide path, and an elastomeric, non-metallic biasing element disposed between said chassis and said slide for urging said slide toward one end of said path, said chassis defining first and second channels on opposite sides of said path and said slide having first and second flanges slidably received in said channels, and said biasing element being a cored out structure having openings therethrough.

10. A biasing element for a vehicle door wedge assembly having a chassis and a slide movable within said chassis, said biasing element comprising:

an elastomeric, nonmetallic body anchored between said chassis and said slide, said biasing element provided as an overmolding for at least a part of said slide.

11. The biasing element of claim 10, said elastomeric body having a lattice-like structure.

12. A biasing element for a vehicle door wedge assembly having a chassis and a slide movable within said chassis, said biasing element comprising:

an elastomeric, nonmetallic body anchored between said chassis and said slide, said biasing element having a projection at one end thereof for mechanical attachment to the chassis.

13. A biasing element for a vehicle door wedge assembly having a chassis and a slide movable within said chassis, said biasing element comprising:

an elastomeric, nonmetallic body anchored between said chassis and said slide, said biasing element having a projection at one end thereof for mechanical attachment to the slide.

14. A vehicle door wedge assembly comprising:

a chassis defining a slide path, said chassis defining first and second channels on opposite sides of said path, a slide movable along said slide path, said slide having first and second flanges slidably received in said channels of said chassis;

an elastomeric, nonmetallic biasing element between the chassis and the slide, the biasing element, being operatively connected to said chassis and said slide, and said biasing element being a cored out structure with openings therethrough.

15. The door wedge assembly of claim 14, the biasing element configured in a lattice-like structure.

* * * * *